US008099076B2

(12) United States Patent
Kramarz-Von Kohout

(10) Patent No.: US 8,099,076 B2
(45) Date of Patent: Jan. 17, 2012

(54) METHOD AND DEVICE IN A TELECOMMUNICATIONS SYSTEM FOR SETTING UP AND BILLING A ROAMING COMMUNICATIONS CONNECTION

(75) Inventor: Gerhard Kramarz-Von Kohout, Bonn (DE)

(73) Assignee: T-Mobile International AG & Co. KG., Bonn (DE)

( * ) Notice: Subject to any disclaimer, the term of this patent is extended or adjusted under 35 U.S.C. 154(b) by 612 days.

(21) Appl. No.: 11/719,276

(22) PCT Filed: Nov. 11, 2005

(86) PCT No.: PCT/DE2005/002038
§ 371 (c)(1),
(2), (4) Date: May 14, 2009

(87) PCT Pub. No.: WO2006/050715
PCT Pub. Date: May 18, 2006

(65) Prior Publication Data
US 2009/0247119 A1     Oct. 1, 2009

(30) Foreign Application Priority Data

Nov. 12, 2004   (DE) .......................... 10 2004 054 664

(51) Int. Cl.
*H04M 11/00* (2006.01)
(52) U.S. Cl. ... 455/406; 455/407; 455/408; 379/114.01; 379/114.15; 379/114.22; 379/114.23

(58) Field of Classification Search .......... 455/406–408; 379/114.01–132
See application file for complete search history.

(56) References Cited

U.S. PATENT DOCUMENTS

| 7,236,768 | B2 * | 6/2007 | Levitan ........................ 455/406 |
| 2004/0053618 | A1 * | 3/2004 | Leppanen et al. ............. 455/445 |
| 2007/0105529 | A1 * | 5/2007 | Lundstrom et al. ........... 455/405 |

FOREIGN PATENT DOCUMENTS

| GB | 2386300 A | 10/2003 |
| WO | 9854920 A1 | 12/1998 |

* cited by examiner

*Primary Examiner* — Kamran Afshar
*Assistant Examiner* — Dung Lam
(74) *Attorney, Agent, or Firm* — Browdy and Neimark, PLLC

(57) ABSTRACT

The invention relates to a method and a device for setting up and billing a roaming communications connection between a first calling subscriber of a first communications network and a second called subscriber of the first and or another communications network who is checked into a roaming communications network. Billing data records concerning the accrued costs of the roaming connection are generated by the communications networks, are exchanged between billing systems of the communications networks, and the subscribers are charged the costs of the roaming connection on the basis of the billing data records. According to the invention, the costs for a connection, which originates from the first, calling subscriber and which is incoming to the second, called subscriber are charged exclusively to the first subscriber under conditions individually agreed upon beforehand.

11 Claims, 1 Drawing Sheet

Figure 1:
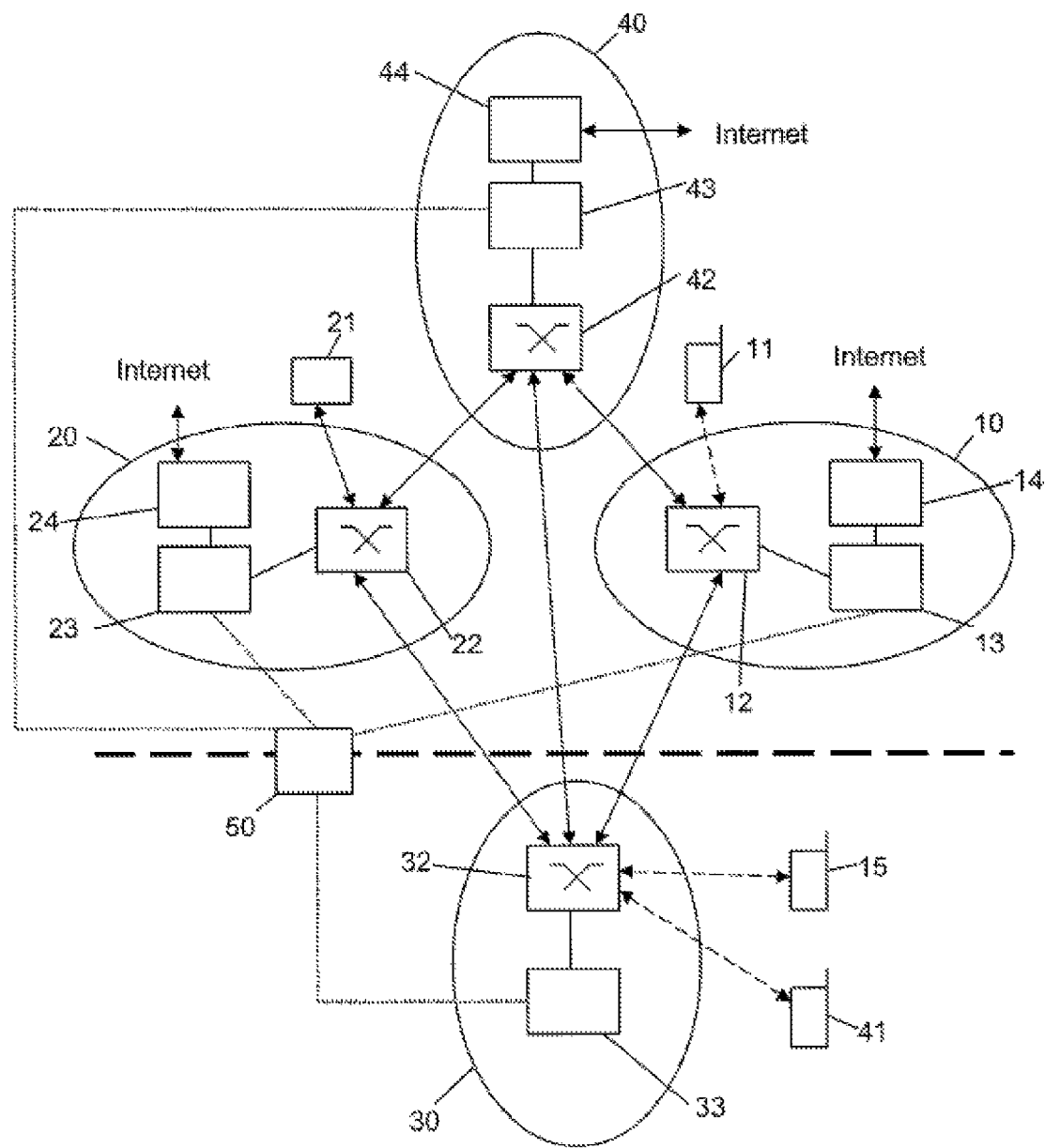

METHOD AND DEVICE IN A TELECOMMUNICATIONS SYSTEM FOR SETTING UP AND BILLING A ROAMING COMMUNICATIONS CONNECTION

The present invention relates to the national and international roaming in mobile communications networks in general and in particular to a method and a device in a telecommunications system for setting up and billing a roaming communications connection especially across country borders between a first subscriber of a first communications network and a second subscriber of the first or another communications network who is registered in a roaming communications network.

International roaming enables a mobile telephone customer, in the following also referred to as subscriber, to use his mobile telephone account abroad. The customer can be reached worldwide in any mobile telephone network in which international roaming is available to him—generally on the basis of a roaming agreement entered into between his home network operator and the foreign network operator—at his own telephone number (if applicable with the country code of his home country), without the need for the caller to know whether the called party is staying abroad, or in which country the called party is staying. The costs for placing and receiving mobile calls in the foreign mobile telephone networks then also appear on the bill from his home mobile telephone provider.

Outgoing and incoming connections abroad are recorded in the mobile telephone network of the respective utilized foreign network operator with the date, time and duration, as well as, in the case of outgoing connections, the destination number, and are priced according to the national tariff scheme of that country. The data records are then generally sent by the foreign network operators to an international clearinghouse, where they are subjected to a tariff review. The clearinghouse, lastly, makes the verified data records available for retrieval for the customer's own home network operator.

The billing information that was recorded in foreign networks is retrieved from this international clearinghouse via an automated process by the own network operator in the course of the further processing via a file transfer that generally takes place daily, and transmitted to his computing center for billing.

For outgoing connections abroad the customer pays the respective applicable rate of the utilized foreign mobile telephone network plus a constant roaming surcharge. The accrued costs are converted into the home currency and charged on the customer's bill along with the applicable home country turnover taxes.

Incoming mobile telephone connections abroad, in contrast to incoming connections at home, are generally subject to charges also for the called party. During a stay abroad the mobile telephone user pays, in the case of an incoming call, a time-based amount—the so-called "roaming leg"—for the use of the foreign mobile telephone network, since the caller does not need to know the current location of his calling partner but simply dials the usual national mobile telephone number and therefore, consequently, needs to pay only as much as for a domestic call. The additional cost for the international call is therefore billed to the called party. Depending on the country of the stay, different tariff zones, if applicable, may be applied for the billing of incoming connections abroad. Some network operators charge additional "surcharges for incoming connections abroad."

This type of billing, in particular of incoming calls but also of the outgoing calls, now causes some customers—possibly out of ignorance of this arrangement—to be annoyed when they see the size of their mobile telephone bill after completion of their travel abroad. Other customers, in turn, who are aware of the basics of the billing principle but not of the details, attempt to avoid incoming calls and generally switch off their mobile device and switch it on only briefly if they themselves wish to make outgoing calls. With this type of behavior incoming calls may still be subject to charges despite the user device being switched off if the customer has activated conditional call forwarding in case of non-availability, because the customer is required to pay for the "outgoing" call from abroad to the destination according to the call forwarding (generally voicemail in the home country). Only an unconditional call forwarding, for example to his voicemail, will guarantee to the customer that he does not have to pay anything for the incoming call (however, call retrieval from voicemail will later be subject to charges).

The existing billing arrangement of roaming calls thus leads to problems at the customer's and at the network operator's: the customers may possibly be annoyed; during stays abroad they use their mobile device only to a limited degree, or at least with misgivings. The network operator, in turn, cannot achieve the revenues he desires if customers resort to the above-mentioned "defense strategies" (switching off the mobile device, activating unconditional call forwarding, etc.). Additionally, the home network operator must anticipate the dissatisfaction of individual customers to whom the conditions for mobile telephone calls abroad are not clear.

The known reverse charging calls that are implemented in many switching technologies make it possible, via the signaling, for the costs for a call to be assumed by the called party. However, in the present case this does not lead to a solution of the problem, since the issue here is the costs of taking a call that accrue for the called party, whereas in the case of the reverse charging the issue is the costs for the call that accrue for the calling party.

Also, the technical approaches are very different:
Reverse charging: "online", i.e. via switching technology/signaling.
Present inventive idea: "offline", i.e. via settlement of the costs in the billing system (described in detail below).

The present invention therefore has as its object to reduce and/or in individual cases solve the described problems and shortcomings that are associated with the roaming due to the calls being subject to charges for the called party.

This object is met according to the invention with a method and a device according to the independent claims, whose disclosure is hereby referenced.

Preferred embodiments and improvements of the invention are specified in the dependent claims, whose disclosure is hereby referenced.

The invention makes it possible for a caller to declare in advance that he will, for a certain period of time, assume the total costs of his calls to certain mobile telephone numbers—optionally within the framework of a budget. This declaration is provided by the caller to his responsible network operator/network service provider. Two example scenarios: children travel abroad on school break or go on a school trip abroad, their parents declare that they will assume the costs for their calls to their children; an employee travels abroad and states that he can be reached via his private mobile telephone, the employer declares his agreement to assume the costs for his calls to the employee.

The declaration of assumption of costs may be provided by SMS, by voice entry to a server with the appropriate capabilities, or by means of other input modes that are preferably analyzable by automated systems (e.g. Web interface).

Calls from other callers (i.e. callers with telephone numbers other than the above-mentioned specified telephone numbers that are known to him in advance) may be accepted by the mobile customer at the usual rates or also not accepted. Not accepting such a call, however, is without charges for him only if he did not activate conditional call forwarding for this, i.e. for the non-acceptance of an incoming call. The mobile customer can thus leave his mobile device switched on without being (as) concerned overall and is, accordingly, reachable in any event for these and other callers.

It is an advantage of the inventive idea that a mobile customer already knows in advance that calls, at least from certain telephone numbers, will be free of charge for him (optionally within the framework of a specified budget) while roaming in foreign mobile telephone networks, as the caller has agreed in advance in these cases in a binding manner to assume the costs for the call acceptance.

It is another advantage of the inventive idea that a mobile customer who has a prepaid contract agreement can nonetheless accept roaming calls in the proposed manner and thus remains reachable even if his prepaid balance may have been used up.

Preferred exemplary embodiments of the invention will be explained in greater detail below with reference to the drawing.

FIG. 1 schematically shows a possible implementation of the invention based on four depicted communications networks, a first mobile telephone network 10, a fixed network 20, a second roaming mobile telephone network 30 located abroad, and a third mobile telephone network 40. A first mobile telephone network subscriber 11 communicates via the mobile telephone network 10, a fixed network subscriber 21 communicates via the fixed network 20, and additional mobile telephone subscribers 15, 41 communicate via the mobile telephone network 30. The communications networks 10, 20, 30, 40 are connected to each other via appropriate (gateway) mobile switching centers 12, 22, 32, 42, thus making it possible for the subscribers 11, 15, 21, 41 to communicate with each other. Each communications network 10, 20, 30, 40 includes a billing center 13, 23, 33, 43, through which the communications services that are used by the respective subscribers 11, 15, 21, 41 are billed. The billing of utilized roaming communications services between countries is handled through an international clearinghouse 50. The relevant billing data is exchanged for this purpose by the billing systems 13, 23, 33, 43 through the clearinghouse 50.

The mobile telephone service providers mentioned below also include those so-called service providers who do not operate their own mobile telephone network but market the mobile telephone services of mobile telephone network operators on their own account and prepare bills for their customers on their own billing systems.

Likewise, it is within the framework of the disclosure of the invention that the procedures and features described in the exemplary embodiments are interchangeable between the individual exemplary embodiments to the extent that this is technically meaningful and possible to implement.

FIRST EXEMPLARY EMBODIMENT OF THE INVENTION

Prerequisites

A caller, e.g. the subscriber 11, shall be able to declare in advance his agreement to assume for a certain period of time the total costs of his calls to certain mobile telephone numbers, e.g. of the subscriber 15. Both the caller 11 and the called party 15 belong to the same mobile service provider of the (home) mobile telephone network 10, so that their billing takes place in one and the same billing system 13.

Possible Implementation:

The mobile service provider of the mobile telephone network 10 operates, within the framework of his billing system 13, a suitable technical device in the form of a database 14 (server). In the database 14, details of the billing modalities are stored for each subscriber, including for the subscribers 11 and 15, which are analyzed by the billing system 13. The subscriber 11 may provide a declaration of assumption of costs for connections to the subscriber 15 and transmit it to the billing system 13, e.g. by SMS in a certain format, by voice entry on an appropriately equipped voice server, via a Web interface (Internet), or by means of other input modes that are preferably analyzable by automated systems.

In any case the caller needs to provide the benefiting telephone numbers, e.g. of the subscriber 15, the (as applicable in each case) relevant time period for the assumption of the charges, or alternatively also a budget that limits the financial scope of his assumption of costs (individual budget per telephone number, or upper cost limit per call per telephone number, or general upper cost limit for each individual call, or total budget for all telephone numbers together). Providing an email address or other contact addresses for the benefiting telephone numbers is recommended as well. An example for a list that is stored in the database 14 is presented in the following table:

| Customer Telephone Number | Beneficiary Telephone Number | Time Period of Benefit | Cost Limit |
|---|---|---|---|
| 0170-1234567 | 0171-4567890 | Sep. 20, 2004- Mar. 10, 2004 | Unlimited |
| 0170-2345678 | 0174-5678901 | Unlimited | € 5 per call |
| 0170-3456789 | 0170-6789012 | Sep. 21, 2004- Sep. 25, 2004 | € 50 |
| 0228-987654 (compare to third exemplary embodiment) | 0170-9012345 | unlimited | unlimited |

The subscriber, in this case subscriber 11, who provides such a declaration must properly identify and authenticate himself as a customer to his mobile service provider/mobile telephone network 10.

If the mobile service provider accepts this declaration from his customer (after appropriate credit checks, if applicable) he can accordingly inform the customers, e.g. subscriber 15, who are to profit from this declaration, for example by SMS or by email, that the costs for calls that the subscriber receives abroad will be borne by the subscriber 11. In the process, the subscriber 15 is preferably informed of, e.g. the telephone number of the subscriber 11, the time period and the budget, if any. Additionally, pertinent information is preferably transmitted on the day of the beginning of the time period and at the end (expiration of the time frame or budget) to both parties (caller 11, beneficiary 15).

The mobile telephone network provider of the mobile telephone network 10 now analyzes this declaration of the customer 11 and stores this information in his billing system 13 in such a way that he enters the information into the database 14 that was prepared for this purpose, in order to obtain an easy overview of all such information from all his customers and thereby allow for further processing.

If a call is now placed by subscriber 11 to subscriber 15 who is staying, e.g. as a roaming subscriber within a foreign mobile telephone network 30, the call from the subscriber 15 is initially recorded in the mobile telephone network 30 in the usual manner, a billing data record is generated and stored in the billing system 33 of the roaming mobile telephone network 30. From the billing system 33 of the mobile telephone network 30 the billing data records of the subscriber 15 are transmitted via the international clearinghouse 50 to the billing system 13 of his home mobile telephone network 10. If the mobile telephone service provider receives, within the framework of the settlement and billing of the roaming traffic with the mobile telephone network operator of the mobile telephone network 30, data records that belong to roaming calls of the subscriber 15, each individual data record that is a data record of a call acceptance by the subscriber 15 is compared to the information stored in the database 14. If the billing system 13, by means of the data comparison, finds a data record in which the telephone number of the caller 11 corresponds to the customer providing the declaration in this case, and the telephone number of the called party 15 corresponds to one of the telephone numbers provided by the subscriber 10, and if the call took place within the stated time period, and the budget, if any, has not been used up, the corresponding amount is charged, contrary to the customary procedure for billing accepted roaming calls, not to the called party 15 but to the caller 10, and the budget, if any, is reduced by the amount for the call.

The mobile telephone provider then prepares via his billing system during the next billing cycle the bills for the caller 11 and the called party 15, taking into account the customer requests. The amount that is billed to the caller 11 is higher, contrary to the customary procedure, by the amount for the incoming roaming calls that are to be assumed by him, by which the bill of the caller 15 is reduced, or by which the bills of the called parties are reduced.

The corresponding database 14 with all this billing information of all subscribers 11, 15, etc. of the mobile telephone service provider's is reviewed regularly and adjusted in terms of those entries whose period of validity has expired and/or whose budget has been used up. This adjustment accordingly reduces the scope of the data comparison in the billing system that is required for this method. An additional storing or recording (outside of and/or in parallel with the database 14) of the information that is relevant here may be necessary for control purposes, for example in the event of arising billing complaints.

SECOND EXEMPLARY EMBODIMENT OF THE INVENTION

Prerequisites

A caller, e.g. the subscriber 11, shall be able to declare in advance his agreement to assume for a certain period of time the total costs of his calls to certain mobile telephone numbers, e.g. of the subscriber 41. The calling subscriber 11 and the called subscriber 41 belong to different mobile telephone providers and different mobile telephone networks 10 and 40, respectively, so that their billing takes place in different billing systems 13 and 43.
Possible Implementation:

The mobile telephone provider (of the caller 11) operates in the mobile telephone network 10 a suitable technical device in the form of a database 14 (server). In the database 14, details of the billing modalities are stored for each subscriber and can be analyzed by the billing system 13. The subscriber 11 may provide a declaration of assumption of costs for connections to the subscriber 41 and transmit it to his own network operator, e.g. by SMS in a certain format, by voice entry on an appropriately equipped voice server, via a Web interface (Internet), or by means of other input modes that are preferably analyzable by automated systems.

In any case the caller needs to provide the benefiting telephone numbers, e.g. of the subscriber 41, the name of the respective responsible mobile telephone service provider, e.g. of the mobile telephone network 40, the (as applicable in each case) relevant time period or alternatively also a budget that limits the financial scope of his assumption of costs (individual budget per telephone number, or upper cost limit per call per telephone number, or general upper cost limit for each individual call, or total budget for all telephone numbers together).

If the subscribers 41a and 41b belong to two mobile telephone service providers and two mobile telephone networks 40a and 40b, respectively, a single total budget for all provided telephone numbers, specifically across mobile telephone service providers, is difficult in that the individual mobile telephone service providers/mobile telephone networks initially do not have an overview of the level of usage of the budget. Conceivable solution: the mobile telephone service provider of the caller continually informs the other mobile telephone service providers of the development of the (remaining) budget.

Providing an email address or other contact addresses for the benefiting telephone numbers, such as of the subscriber 41 is recommended as well.

The subscriber 11 who provides such a declaration must properly identify and authenticate himself as a customer to his mobile service provider and mobile telephone network 10.

If the mobile service provider of the caller, in this case subscriber 11, accepts this declaration from his customer (after appropriate credit checks, if applicable) he can accordingly inform the customers, in this case subscriber 41, of the other mobile telephone service provider/mobile telephone network 40 who are to benefit from this declaration, for example by SMS or by email. In the process, these subscribers are informed, e.g. of the telephone number of the caller, the time period and the budget, if any. Additionally, pertinent information is transmitted on the day of the beginning of the time period and at the end (expiration of the time frame or budget) to both parties (caller, beneficiary).

The mobile telephone network provider of the caller 11 now analyzes this declaration of the caller and stores this information in his billing system 13 in such a way that he enters the information into a database 14 that was prepared for this purpose, in order to obtain an easy overview of all such information from all his customers and thereby allow for further processing. The mobile telephone service provider of the caller 11 thus enters into the database under the corresponding entry of the telephone number of the caller those telephone numbers, e.g. of subscriber 41, for whose call acceptances the subscriber 11 wishes to assume the costs in the roaming case, their responsible mobile telephone service providers/mobile telephone networks, and the individual/total budget, if any.

Additionally, for all called parties for whom costs are assumed by the caller 11, e.g. subscriber 41, the information regarding the assumption of the costs must be exchanged in each case between the mobile telephone service provider of the network 10 of the caller 11 and the mobile telephone service provider of the network 40 of a called party 41, which means that the data of the database 14 of the billing system 13 is transmitted to the database 44 of the billing system 43 of the communications network 40. This generally requires that a corresponding contractual agreement exists in advance between the two parties, which is either entered into directly between the involved parties or indirectly through agreements between intermediary channels.

Let the following apply:

MA mobile telephone service provider of the caller 11
NA=mobile telephone network operator of the mobile telephone network 10 of the caller 11
NB=mobile telephone network operator of the mobile telephone network 40 of the called party 41
MB mobile telephone service provider of the called party 41

MA and MB in this case are different companies, MA and NA may be different or also identical; likewise, MB and NB may be different or also identical.

MA now needs to have an agreement with MB. It may be entered into directly between the two involved parties, MA, MB. Alternatively, however, agreements could also be entered into between MA and NA, between NA and NB, as well as between NB and MB, so that an indirect agreement then results between MA and MB.

The direct or indirect agreement between MA and MB must contain especially the following:

that MA upon request of the calling subscriber 11 forwards to MB in reliable form, preferably secured by encrypting, the information that the subscriber 11 will assume the costs for accepted calls from subscriber 11 to subscriber 41 while subscriber 41 is roaming in a foreign mobile telephone network 30, and to what extent (time period; individual/total budget, if any) this is to occur, that MB forwards to MA data records that MB receives from a foreign network operator/mobile telephone network 31 and that contain a call acceptance by subscriber 41 of a call from subscriber 11, that MB does not bill this data record to the subscriber 41, that MB receives, in settlement of his costs, from MA an appropriate value adjustment.

Previously established agreements for exchanging and billing of data records already exist between MA and NA and MB and NB, respectively (where MA and NA or MB and NB are not identical). Previously established (roaming) agreements generally already exist between NA and NB if they are active in different countries. If NA and NB are from the same country, an agreement nowadays generally only exists if national roaming is accepted. These established agreements can be built upon here. If no previously established agreement exists, it is necessary that a new agreement be entered into.

Since the two subscribers 11 and 41 are generally from the same country, purely national agreements will then suffice. If all mobile telephone network operators of a country were to enter into agreements for this purpose, those mobile telephone service providers who are not network operators could then base themselves on their agreements. In this manner the invention can then cover the case of a purely national roaming in cases in which a call acceptance with costs was agreed upon.

MA now forwards, on the basis of a corresponding agreement, the declaration of his customer (calling subscriber 11) to the mobile telephone service provider MB (of the benefiting subscriber 41).

MB now analyzes this declaration of the caller A and stores this information in his billing system in such a way that he enters the information into a database 44 that was prepared for this purpose, in order to obtain an easy overview of all such information from all his customers and thereby allow for further processing. MB thus enters into the database 44 under the telephone number of the caller 41 the telephone number of the subscriber 11 who wishes to assume the costs for call acceptances of subscriber 41 in the roaming case, the responsible mobile telephone service provider MA, as well as the individual/total budget, if any, as relates to the subscriber.

If MB now receives within the framework of the settlement and billing of the roaming traffic with other mobile telephone network operators from their billing systems 33 data records that belong to roaming calls, each individual data record that is a data record of a call acceptance is compared to the list of his customers that is contained in the database 44. If MB finds, by means of the data comparison, a data record in which the telephone number of the called party 41 and the corresponding telephone number of the caller 11 match, if the call took place within the specified time period, and if the budget, if any, (as relates to the caller 11) has not been used up, the corresponding amount is not billed to the called party 41, contrary to the customary procedure for billing call acceptances in the roaming case.

MB of the of the network 40 collects these data records requiring special treatment and then transmits them to MA of the network 10 on the basis of their direct or indirect agreements. As a rule, this transmission will take place secured, en bloc (relating to all his customers B for whom costs are assumed by a caller A of MA) and on a regular basis. MA, in return, compensates MB for the value.

If applicable, MA and MB reduce the budget of subscriber 11 in their respective databases 14 and 44.

The mobile telephone service providers MA and MB then prepare the bills for their customers, taking into account the relevant customer requests.

The databases 14 and 44 that contain all such information from all their customers are reviewed regularly by MA and MB and adjusted in terms of those entries whose period of validity has expired and/or whose budget has been used up. This adjustment accordingly reduces the scope of the data comparison that is required for this method. An additional storing or recording (outside of and/or in parallel with the database 14) of the information that is relevant here may be necessary for control purposes, for example in the event of arising billing complaints.

THIRD EXEMPLARY EMBODIMENT OF THE INVENTION

Prerequisites

A caller shall be able to declare in advance his agreement to assume for a certain period of time the total costs of his calls to certain mobile telephone numbers. The caller belongs to a fixed network service provider (generally identical with the associated fixed network operator), the called party belongs to a mobile telephone service provider. The billing takes place in different billing systems 23 and 13, respectively.

Possible Implementation:

The implementation of the third embodiment corresponds almost exactly to the implementation according to the second embodiment.

The significant difference lies in that the calling subscriber 21 is a subscriber of a fixed network 20. In the description of the second embodiment, the terms mobile telephone service provider MA and mobile telephone network operator NA therefore need to be replaced by fixed network provider FA and fixed network operator FNA of the fixed network 20.

Since FA as a fixed network provider generally has no experience in dealing with roaming data records from the mobile telephone business, it is recommended that MB not only make available to the fixed network operator FA the data records in their raw form, but also prepare and analyze the data for FA.

This third embodiment is therefore particularly relevant for groups of telecommunication companies that offer both fixed network services as well as mobile telephone services.

Treatment of Special Cases:
Total Costs:

In individual cases, the total costs of a call to a called party who is roaming abroad may consist not only of the costs of the call to the telephone number in his home location area (customarily to be borne by the calling party), the costs of the forwarding abroad, which corresponds to the costs of the call acceptance by the calling party abroad (customarily to be borne by the called party; according to the present inventive idea to be borne by the calling party upon request of the calling party), but additionally of a third cost component. The third cost component is customarily to be borne by the called party and is incurred if the called party has activated conditional call forwarding and if it is used (e.g. call forwarding, if a call is not accepted, to voicemail abroad). The associated data records of this third component, however, are data records of outgoing calls and are charged also as outgoing calls for the called party.

In the above descriptions of the possible implementations this third cost component is not included in the assumption of costs by the caller. To prevent disagreements among the involved parties arising from this "third" cost component, various solutions are conceivable:

The called party deactivates the conditional call forwarding in a timely manner; this will then prevent the third cost component from being incurred.

MB forces via NB the deactivation of the conditional call forwarding for the called party if a declaration of assumption of costs by a caller for call acceptances by the called party was provided to him.

The mobile telephone service providers of the calling party and of the called party explicitly inform their customers of the non-inclusion of the third cost component.

If the caller agrees to also assume the third cost component, this can be implemented accordingly. This requires, on the part of MB, a thorough analysis of the data records that belong to roaming calls. He now needs to also analyze the data records as to whether an additional, simultaneous data record of an outgoing call (to the destination of the call forwarding, e.g. voicemail) exists for a data record of a call acceptance by the called party, and, if applicable, he must then bill this additional data record of an outgoing call to the calling party.

Caller ID

A caller generally has the option of blocking his telephone number from being displayed on the user device of the called party. In connection with the cost assumption of a call acceptance that is proposed here this could lead to the difficult situation that the called party in the roaming case that is of importance here does not know who is calling him and whether or not accepting the call is now free of charge for him.

To overcome this difficult situation, the following is proposed:

The caller is informed at the time of his declaration of assumption of costs relating to accepted calls of the consequences of caller ID blocking and is asked to deactivate caller ID blocking.

MA effects (in cooperation with NA) the forced deactivation of caller ID blocking (while a declaration of assumption of costs is active.)

Cost Assumption Dialog

The three described embodiments of the invention assume that the caller declares his willingness to assume the costs and that the called party accepts this in this form.

It would be conceivable to additionally obtain from the called party a formal confirmation of his willingness not to pay for the call acceptance himself in the roaming case.

Likewise, it would be conceivable that the called party initially expresses the desire to MB to have the caller assume the costs and the caller then subsequently declares to MA his willingness to assume the costs.

Provision may also be made that a subscriber declares his agreement to assume the costs for connections to another subscriber not to his own network operator but directly to the network operator of the other subscriber. The network operators will then negotiate the billing modalities among themselves.

LIST OF REFERENCE NUMERALS

10 Mobile telephone network
11 Mobile telephone subscriber
12 Mobile switching center (MSC)
13 Billing system
14 Database
15 Mobile telephone subscriber (roaming subscriber)
20 Fixed network
21 Fixed network subscriber
22 Switching center
23 Billing system
24 Database
30 Mobile telephone network (roaming network)
31
32 Mobile switching center (MSC)
33 Billing system
34 Database
40 Mobile telephone network
41 Mobile telephone subscriber (roaming subscriber)
42 Mobile switching center (MSC)
43 Billing system
44 Database
50 International clearinghouse

What is claimed is:

1. A method for setting up and billing a roaming communications connection between a first, calling subscriber of a first communications network and a second, called subscriber of the first or a second communications network, who is registered in a roaming communications network, the method comprising:

prior to setting up the roaming communications connection:

transmitting a message from the first subscriber to a billing system of the first communications network, wherein said message is stored in a billing database of the billing systems of the first and second communication networks and contains a declaration of the first subscriber to assume the costs of any roaming connections that are incoming to the second subscriber;

informing the second subscriber, who is to profit from the declaration of the first subscriber, that costs for calls that the second subscriber receives abroad will be borne by the first subscriber;

effecting a forced deactivation of caller ID blocking while the declaration of assumption of costs by the first subscriber is active;

during or after setting up the roaming communications connection:

generating billing data records concerning accrued costs of the roaming connection by the billing systems of the first and second communications networks;

exchanging the billing data records between the billing systems of the first and second communications networks; and charging the subscribers the costs of the roaming connection on the basis of the billing data records, wherein the costs for a connection that originates from the first, calling subscriber and that is incoming to the second, called subscriber are charged exclusively to the first subscriber under conditions individually agreed upon beforehand in said message.

2. A method as set forth in claim 1, wherein the roaming communications connection is a roaming communications connection across country borders.

3. A method as set forth in claim 1, wherein the message contains information from the first subscriber to assume the costs of the incoming roaming connections for a specified period of time and/or up to the amount of a specified budget or cost limit.

4. A method as set forth in claim 1, wherein the message is transmitted to the billing system by short message service (SMS), by voice entry on an appropriately equipped server, by means of an Internet portal, or by means of other input modes that are preferably analyzable by automated systems.

5. A method as set forth in claim 1, further comprising storing, in a database of the billing system, at least one telephone number of the benefiting second subscriber, linked to a mobile telephone number of the first subscriber.

6. A method as set forth in claim 1, further comprising storing, in the billing database of the billing system, a time period for the cost assumption and/or a budget/cost limit, linked to a mobile telephone number of the first subscriber and to a telephone number of the second subscriber.

7. A method as set forth in claim 1, further comprising, after a roaming connection between the first subscriber and the second subscriber is establish, generating a corresponding billing data record in the roaming communications network for an incoming connection, transmitting the generated corresponding billing data record to the billing system of the communications network of the second subscriber, comparing, in the communications network of the second subscriber, the data of the billing data record to the data that is stored in the database, and if the compared data match, charging the costs of the incoming roaming connection to the communications network of the first subscriber.

8. A method as set forth in claim 1, wherein the first communications network (20) is a fixed network.

9. A method as set forth in claim 1, wherein the first communications network (10) is a mobile communications network.

10. A method as set forth in claim 1, wherein the second communications network and the roaming communications network are mobile communications networks.

11. A method as set forth in claim 1, wherein the first and second subscribers each have a prepaid contract agreement.

* * * * *